United States Patent
Segawa et al.

(10) Patent No.: US 10,233,828 B2
(45) Date of Patent: Mar. 19, 2019

(54) VARIABLE NOZZLE UNIT AND VARIABLE GEOMETRY SYSTEM TURBOCHARGER

(71) Applicants: IHI Corporation, Koto-ku (JP); IHI Charging Systems International GmbH, Heidelberg (DE)

(72) Inventors: Kenichi Segawa, Tokyo (JP); Nobuyuki Ikeya, Tokyo (JP); Tobias Scheuermann, Heidelberg (DE); Thorben Kotzbacher, Heidelberg (DE)

(73) Assignees: IHI Corporation, Koto-ku (JP); IHI Charging Systems International GmbH, Heidelberg (DE)

(*) Notice: Subject to any disclaimer, the term of this patent is extended or adjusted under 35 U.S.C. 154(b) by 325 days.

(21) Appl. No.: 15/174,186

(22) Filed: Jun. 6, 2016

(65) Prior Publication Data
US 2016/0281593 A1    Sep. 29, 2016

Related U.S. Application Data

(63) Continuation of application No. PCT/JP2014/078161, filed on Oct. 23, 2014.

(30) Foreign Application Priority Data

Dec. 19, 2013 (JP) ................. 2013-261988

(51) Int. Cl.
*F01D 17/16* (2006.01)
*F02B 37/22* (2006.01)
(Continued)

(52) U.S. Cl.
CPC ............. *F02B 37/22* (2013.01); *F01D 5/02* (2013.01); *F01D 5/12* (2013.01); *F01D 9/04* (2013.01);
(Continued)

(58) Field of Classification Search
CPC .. F02B 37/22; F02B 37/24; F01D 5/12; F01D 5/02; F01D 9/04; F01D 17/16;
(Continued)

(56) References Cited

U.S. PATENT DOCUMENTS 5,767,615 A    6/1998  Endo
7,509,804 B2*  3/2009  Kobayashi ............ F01D 17/165
                                                    415/158

(Continued)

FOREIGN PATENT DOCUMENTS

CN    101649756 A    2/2010
CN    102639838 A    8/2012
(Continued)

OTHER PUBLICATIONS

International Search Report dated Dec. 9, 2014 in PCT/JP2014/078161 filed on Oct. 23, 2014.
(Continued)

*Primary Examiner* — Eldon T Brockman
(74) *Attorney, Agent, or Firm* — Oblon, McClelland, Maier & Neustadt, L.L.P.

(57) ABSTRACT

A base portion of the support ring includes as many joining areas as connection pins. The joining areas respectively surround pin holes through which to insert end portions of the connection pins, and are arranged in a circumferential direction of the support ring. Cuts are formed around each joining area of the support ring in order to allow deformation of an intermediate portion of the support ring relative to the joining area.

12 Claims, 5 Drawing Sheets

(51) Int. Cl.
*F01D 5/02* (2006.01)
*F01D 5/12* (2006.01)
*F01D 9/04* (2006.01)
*F01D 25/16* (2006.01)
*F02B 37/24* (2006.01)

(52) U.S. Cl.
CPC .......... *F01D 17/16* (2013.01); *F01D 17/165* (2013.01); *F01D 25/162* (2013.01); *F02B 37/24* (2013.01); *F05D 2220/40* (2013.01); *F05D 2230/642* (2013.01); *F05D 2240/52* (2013.01); *Y02T 10/144* (2013.01)

(58) Field of Classification Search
CPC .... F01D 25/162; F01D 17/165; Y02T 10/144; F05D 2230/642; F05D 2240/52; F05D 2220/40
See application file for complete search history.

(56) References Cited

U.S. PATENT DOCUMENTS

| | | | | |
|---|---|---|---|---|
| 9,121,300 | B2* | 9/2015 | Matsuyama | F01D 17/165 |
| 9,618,005 | B2* | 4/2017 | Segawa | F01D 11/005 |
| 2007/0175216 | A1* | 8/2007 | Kobayashi | F01D 17/165 60/605.2 |
| 2009/0092483 | A1 | 4/2009 | Yasui et al. | |
| 2010/0310363 | A1* | 12/2010 | Matsuyama | F01D 17/165 415/212.1 |
| 2012/0237343 | A1* | 9/2012 | Matsuyama | F01D 17/165 415/182.1 |
| 2015/0056067 | A1* | 2/2015 | Segawa | F01D 11/005 415/167 |

FOREIGN PATENT DOCUMENTS

| | | |
|---|---|---|
| EP | 2 325 454 A1 | 5/2011 |
| EP | 2 514 945 A1 | 10/2012 |
| EP | 2 594 745 A2 | 5/2013 |
| JP | 7-37519 | 2/1995 |
| JP | 2006-12588 | 1/2006 |
| JP | 2008-106667 | 5/2008 |
| JP | 2009-74492 | 4/2009 |
| JP | 2009-243300 | 10/2009 |
| JP | 2009-243431 | 10/2009 |
| JP | 2010-24915 | 2/2010 |
| JP | 2010-196657 A | 9/2010 |
| JP | 2010-216281 | 9/2010 |
| JP | 2010-229908 | 10/2010 |
| JP | 2011-85054 | 4/2011 |
| JP | 2011-85114 | 4/2011 |
| JP | 2013-253519 | 12/2013 |
| JP | 2013-253520 A | 12/2013 |
| WO | WO 2013/180049 A1 | 12/2013 |

OTHER PUBLICATIONS

Written Opinion dated Dec. 9, 2014 in PCT/JP2014/078161 filed on Oct. 23, 2014.
Office Action dated May 9, 2017 in Japanese Patent Application No. 2013-261988.
Extended European Search Report dated Aug. 3, 2017 in Patent Application No. 14871084.1.
Combined Office Action and Search Report dated Dec. 1, 2017 in Chinese Patent Application No. 201480066448.1 (with English translation of category of cited documents).

* cited by examiner

VARIABLE NOZZLE UNIT AND VARIABLE GEOMETRY SYSTEM TURBOCHARGER

CROSS REFERENCE TO RELATED APPLICATIONS

This application is a continuation application of International Application No. PCT/JP2014/078161, filed on Oct. 23, 2014, which claims priority to Japanese Patent Application No. 2013-261988, filed on Dec. 19, 2013, the entire contents of which are incorporated by reference herein.

BACKGROUND

1. Technical Field

The present disclosure relates to a variable nozzle unit capable of varying the area of a passage (a flow rate) of an exhaust gas to be supplied to a turbine impeller in a variable geometry system turbocharger, and the like.

2. Description of the Related Art

Various developments have been made for a variable nozzle unit to be placed inside a turbine housing of a variable geometry system turbocharger. The applicant of this application has already filed applications related to developments for the variable nozzle unit (see Japanese Patent Application Laid-Open Publication Nos. 2009-243431 (PTL1), and 2009-243300 (PTL2)). A configuration of the variable nozzle unit related to the conventional technique is as follows.

A support ring is placed inside a turbine housing. The support ring includes an annular base portion. A cylindrical intermediate portion is formed on an outer peripheral edge of this base portion (the base portion of the support ring) to project toward one side in an axial direction of a turbine impeller. Furthermore, an annular tip end edge portion (flange portion) is integrally formed on a tip end edge of the intermediate portion of the support ring to project outward in a radial direction of the support ring. The tip end edge portion (the flange portion of the support ring) is held between the turbine housing and a bearing housing of a variable geometry system turbocharger.

A nozzle ring is integrally provided to the base portion of the support ring by joining end portions (end portions in the axial direction) respectively of three or more connection pins to the base portion by riveting, where the connection pins are arranged in the circumferential direction of the support ring. At a position away from the nozzle ring in the axial direction, a shroud ring is integrally provided to the nozzle ring by fitting opposite end portions (opposite end portions in the axial direction) respectively of the multiple connection pins to the shroud ring (by riveting). The shroud ring covers tip end edges of multiple turbine blades of the turbine impeller.

Between mutually-facing surfaces of the nozzle ring and the shroud ring, multiple variable nozzles are placed at equal intervals in the circumferential direction. Each variable nozzle is turnable in forward and reverse directions (opening and closing directions) on its axis parallel with an axis of the turbine impeller. In this respect, when the multiple variable nozzles are synchronously turned in the forward direction (opening direction), the area of a passage of an exhaust gas to be supplied to the turbine impeller increases. When the multiple variable nozzles are synchronously turned in the reverse direction (closing direction), the area of the passage of the exhaust gas to be supplied to the turbine impeller decreases.

SUMMARY

Meanwhile, while the variable geometry system turbocharger is in operation, the member temperatures of the base portion and a base end edge-side portion of the intermediate portion of the support ring become higher because the base portion and the base end edge-side portion of the intermediate portion receive heat from the nozzle ring. The member temperatures of the tip end edge portion (flange portion) and a tip end edge-side portion of the intermediate portion of the support ring become lower because the bearing housing absorbs heat from (cools) the tip end edge portion (flange portion) and the tip end edge-side portion of the intermediate portion. For these reasons, the support ring, particularly the intermediate portion of the support ring, is thermally deformed to expand from inside. In response to the thermal deformation, the nozzle ring is deformed. As a result, the parallelism between the mutually-facing surfaces of the nozzle ring and the shroud ring worsens, and the clearance between the mutually-facing surfaces of the nozzle ring and the shroud ring becomes locally narrower.

Against this background, unsmooth turn of the multiple variable nozzles is inhibited, and the stability of the turn operation of the multiple variable nozzles is sufficiently secured normally by setting a larger nozzle-side clearance to make a minimum clearance between the mutually-facing surfaces of the nozzle ring and the shroud ring become larger than the widths (lengths in the axial direction) of the variable nozzles while the variable geometry system turbocharger is in operation. However, if too large nozzle-side clearance is set, leaking flow of the exhaust gas through the nozzle-side clearance increases, and it becomes difficult to enhance the turbine efficiency of the variable geometry system turbocharger to a higher level. Incidentally, the nozzle-side clearance means a clearance between the facing surface of the nozzle ring and side surfaces of the respective variable nozzles on the one side in the axial direction, or a clearance between the facing surface of the shroud ring and side surfaces of the respective variable nozzles on the opposite side in the axial direction.

In short, there has been a problem that it is difficult to enhance the turbine efficiency of the variable geometry system turbocharger while sufficiently securing the stability of the turn operation of the multiple variable nozzles.

With this problem taken into consideration, an object of the present disclosure is to provide a variable nozzle unit and the like which are capable of solving the foregoing problem.

A first aspect of the present disclosure is a variable nozzle unit configured to be placed surrounding a turbine impeller inside a turbine housing of a variable geometry system turbocharger, and capable of varying an area of a passage of an exhaust gas to be supplied to the turbine impeller. This variable nozzle unit is summarized as including: a support ring configured to be placed inside the turbine housing which includes an annular base portion, a cylindrical intermediate portion integrally formed on an outer peripheral edge of the base portion to project toward one side in an axial direction of the turbine impeller, and an annular tip end edge portion integrally formed on a tip end edge of the intermediate portion to project outward in a radial direction of the support ring, and held between the turbine housing and a bearing housing of the variable geometry system turbocharger; a nozzle ring integrally provided to the base portion of the support ring by joining end portions of three or more connection pins to the base portion thereof, the connection pins arranged in a circumferential direction of the base portion; a shroud ring integrally provided to the nozzle ring by joining opposite end portions of the plurality of connection pins to the shroud ring at a position away from the nozzle ring in the axial direction, and covering tip end edges respectively of a plurality of turbine blades of the turbine impeller; and a plurality of variable nozzles placed between mutually-facing surfaces of the nozzle ring and the shroud ring in a circumferential direction of the nozzle ring or the shroud ring, and capable of turning on axes thereof in forward and reverse directions, the axes being in parallel with an axis of the turbine impeller, wherein the base portion of the support ring includes as many joining areas as the connection pins, the joining areas respectively surround pin holes through which to insert the end portions of the connection pins, the joining areas are in contact with an opposite surface of the nozzle ring from its facing surface, and the joining areas are arranged in a circumferential direction of the support ring, and a cut is formed in each of parts of the support ring which are located outward of the respective joining areas in the radial direction of the support ring.

It should be noted that: in the description and scope of claims of this application, the meaning of "placed" includes directly placed, and indirectly placed with a different member interposed in between; the meaning of "provided" includes directly provided, and indirectly provided with a different member interposed in between; and the meaning of "joining" includes joining by riveting, joining by welding, and the like.

A second aspect of the present disclosure is a variable geometry system turbocharger configured to boost air to be supplied to an engine by use of energy of an exhaust gas from the engine, summarized as including the variable nozzle unit according to the first aspect.

The second aspect brings about the same operation and effect as does the first aspect.

The present disclosure can sufficiently secure the stability of the turn operation of the multiple variable nozzles by inhibiting unsmooth turn of the multiple variable nozzles, and can concurrently enhance the turbine efficiency of the variable geometry system turbocharger by reducing the leaking flow of the exhaust gas through the nozzle-side clearance.

DESCRIPTION OF THE EMBODIMENTS

Figure 1A:
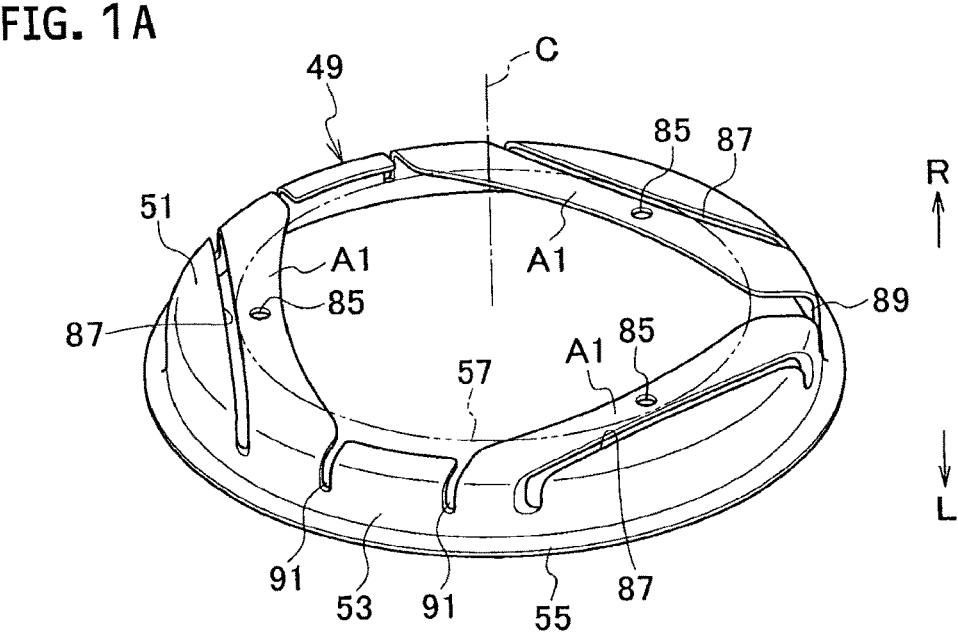
FIG. 1A is a perspective view of a support ring of an embodiment of the present disclosure.

Referring to FIGS. 1 to 5, descriptions will be provided for an embodiment of the present disclosure. It should be noted that "L" and "R" mean leftward and rightward, respectively, as shown in the drawings.

Figure 3:
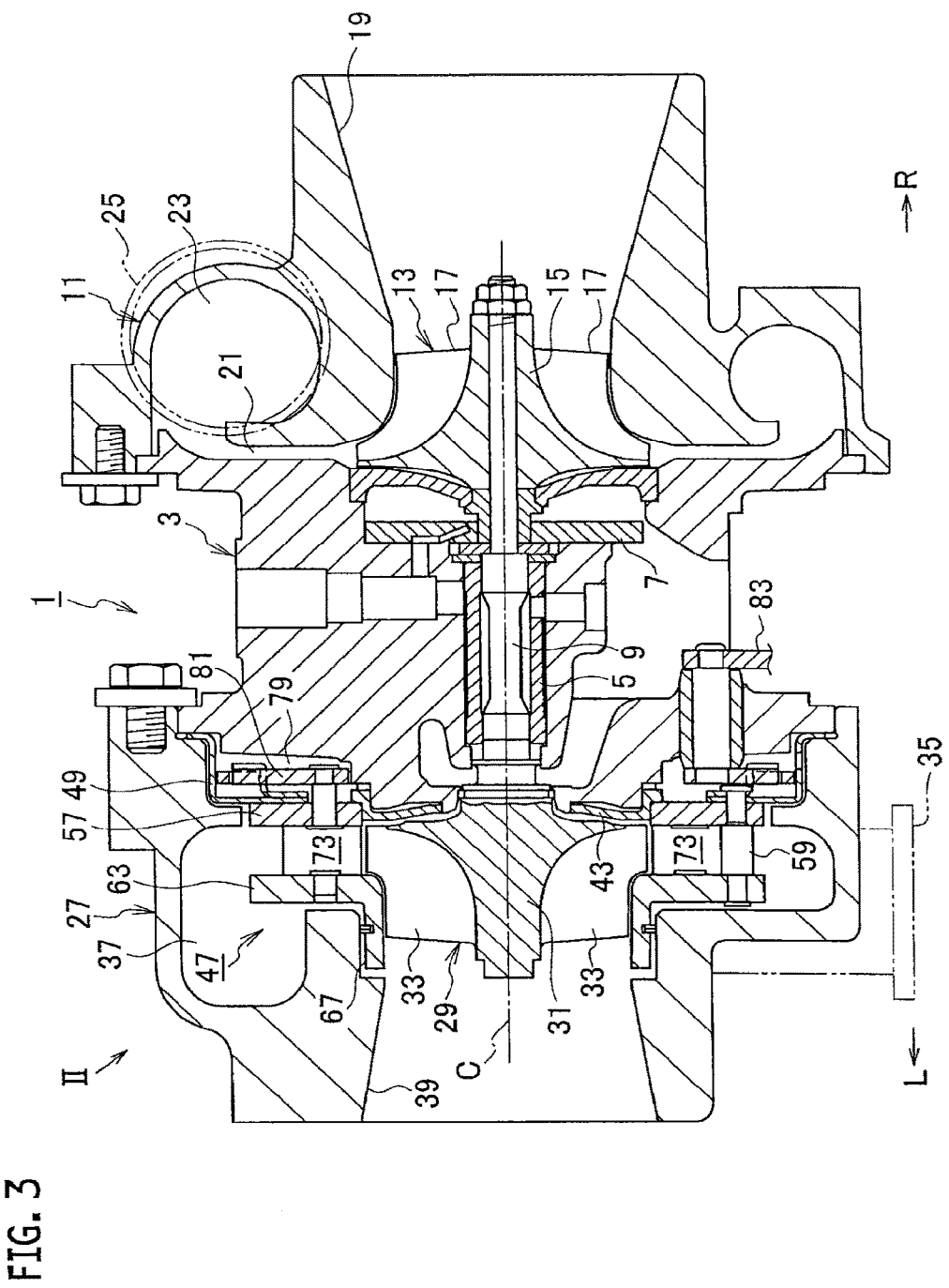
FIG. 3 is a front cross-sectional view of a variable geometry system turbocharger of the embodiment of the present disclosure.

As shown in FIG. 3, a variable geometry system turbocharger 1 of the embodiment of the present disclosure is a turbocharger configured to boost (compress) air to be supplied to an engine (whose illustration is omitted) by using energy of an exhaust gas from the engine. A configuration of the variable geometry system turbocharger 1 is as follows.

The variable geometry system turbocharger 1 includes a bearing housing 3. A radial bearing 5 and a pair of thrust bearings 7 are provided inside the bearing housing 3. A rotor shaft (turbine shaft) 9 extending in a left-right direction is rotatably provided to the multiple bearings 5, 7. In other words, the rotor shaft 9 is rotatably provided to the bearing housing 3 with the multiple bearings 5, 7 interposed in between.

A compressor housing 11 is provided to the right of the bearing housing 3. A compressor impeller 13 is provided inside the compressor housing 11 in such a manner as to be rotatable on its axis (in other words, the axis of the rotor shaft 9) C. Furthermore, the compressor impeller 13 includes: a compressor wheel 15 integrally connected to a right end portion of the rotor shaft 9; and multiple compressor blades 17 provided on an outer peripheral surface of the compressor wheel 15 at equal intervals in a circumferential direction of the compressor wheel 15.

An air introduction port 19 through which to introduce air is formed in the compressor housing 11 at the side of an inlet of the compressor impeller 13 (in a right portion of the compressor housing 11). The air introduction port 19 is connectable to an air cleaner (whose illustration is omitted) configured to clean the air. An annular diffuser passage 21 configured to boost the pressure of the compressed air is formed at the side of an outlet of the compressor impeller 13 between the bearing housing 3 and the compressor housing 11. The diffuser passage 21 communicates with the air introduction port 19. Moreover, a scroll-shaped compressor scroll passage 23 is formed inside the compressor housing 11. The compressor scroll passage 23 communicates with the diffuser passage 21. Furthermore, an air discharge port 25 through which to discharge the compressed air is formed in the compressor housing 11 at an appropriate position. The air discharge port 25 communicates with the compressor scroll passage 23, and is connectable to an intake manifold (whose illustration is omitted) of the engine.

Figure 2:
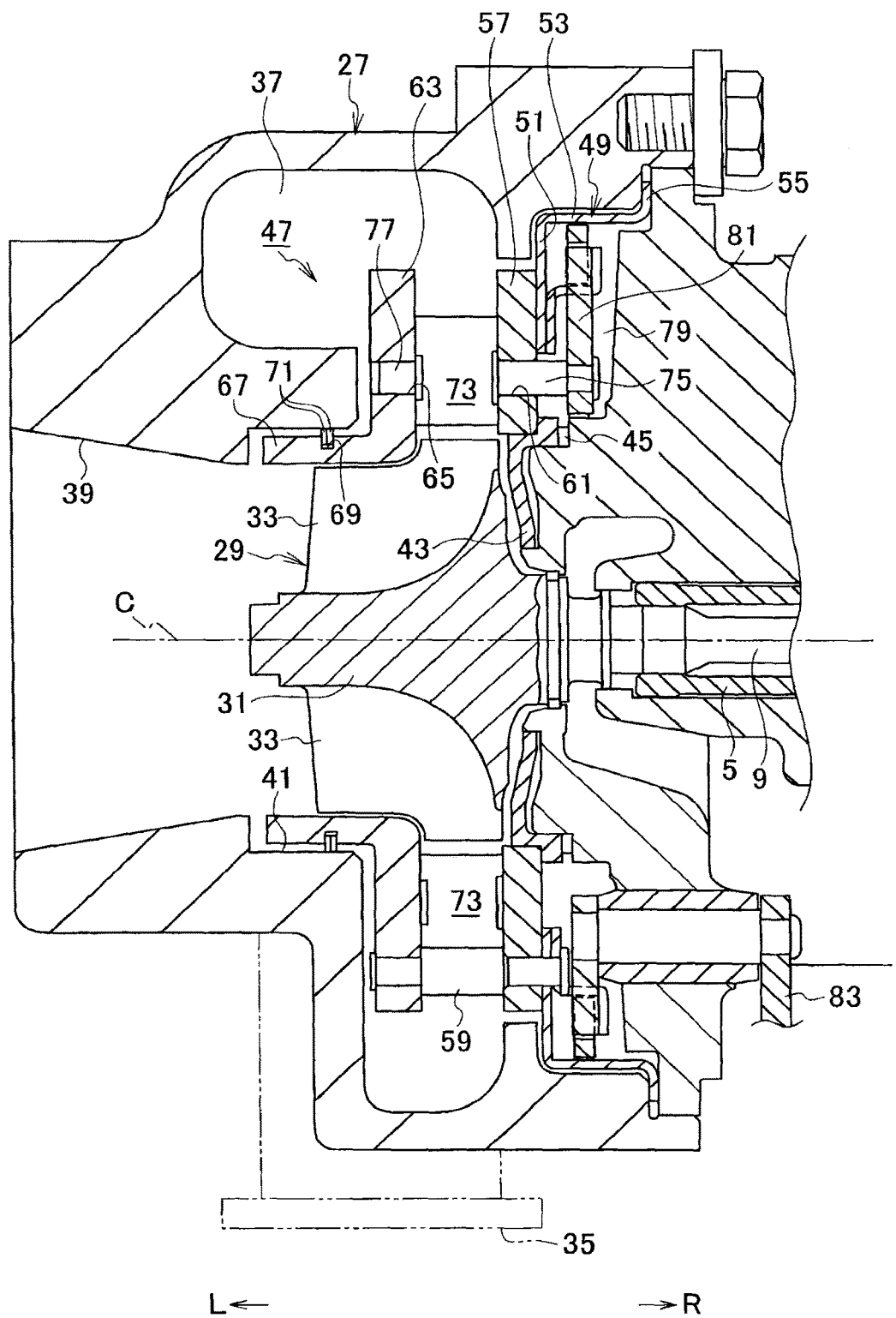
FIG. 2 is a magnified view of an arrow-indicated portion II in FIG. 3.

As shown in FIGS. 2 and 3, a turbine housing 27 is provided to the left of the bearing housing 3. A turbine impeller 29 configured to produce rotational force (rotational torque) by using pressure energy of the exhaust gas is provided inside the turbine housing 27 in such a manner as to be rotatable on its axis (in other words, the axis of the rotor shaft 9) C. The turbine impeller 29 includes: a turbine wheel 31 integrally provided to a left end portion of the rotor shaft 9; and multiple turbine blades 33 provided on an outer peripheral surface of the turbine wheel 31 at equal intervals in a circumferential direction of the turbine wheel 31.

A gas introduction port 35 through which to introduce the exhaust gas is formed in the turbine housing 27 at an appropriate position. The gas introduction port 35 is connectable to an exhaust manifold (whose illustration is omitted) of the engine. A scroll-shaped turbine scroll passage 37 is formed inside the turbine housing 27. The turbine scroll passage 37 communicates with the gas introduction port 35. Furthermore, a gas discharge port 39 through which to discharge the exhaust gas is formed in the turbine housing 27 at the side of an outlet of the turbine impeller 29 (left of the turbine housing 27). The gas discharge port 39 communicates with the turbine scroll passage 37, and is connectable to an exhaust emission control system (whose illustration is omitted) configured to clean the exhaust gas. An annular step portion 41 is formed inside the turbine housing 27 at the side of an inlet of the gas discharge port 39.

It should be noted that an annular heat insulator 43 configured to block heat from the side of the turbine impeller 29 is provided to a left side surface of the bearing housing 3. A corrugated washer (wave washer) 45 is provided between the left side surface of the bearing housing 3 and an outer edge portion of the heat insulator 43. The corrugated washer 45 biases the heat insulator 43 toward a nozzle ring 57, which will be described later. Incidentally, the corrugated washer 45 may be replaced with an elastic member, such as a disc spring or a leaf spring, which exerts the same function as does the corrugated washer 45.

Inside the turbine housing 27, a variable nozzle unit 47 is placed between the turbine scroll passage 37 and the gas discharge port 39 in such a manner as to surround the turbine impeller 29. The variable nozzle unit 47 is capable of varying the area of a passage (a flow rate) of the exhaust gas to be supplied to the turbine impeller 29. To this end, a configuration of the variable nozzle unit 47 of the embodiment of the present disclosure is as follows.

Figure 1B:
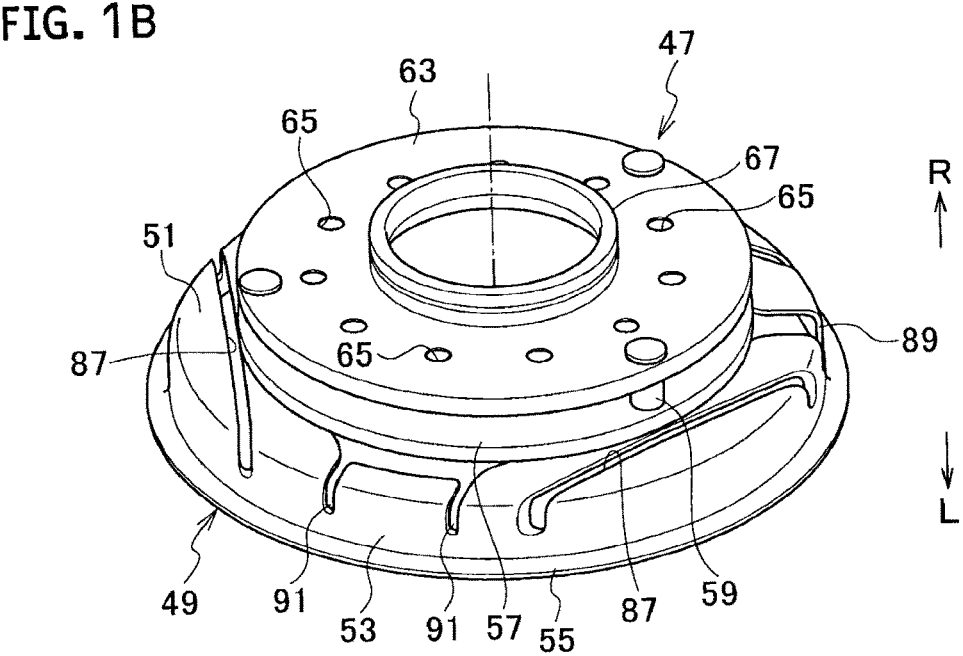
FIG. 1B is a perspective view of a variable nozzle unit of the embodiment of the present disclosure.

As shown in FIGS. 1A, 1B and 2, inside the turbine housing 27, a support ring 49 is placed coaxially with the turbine impeller 29. The support ring 49 includes an annular base portion 51 located coaxially with the turbine impeller 29. A cylindrical intermediate portion 53 is integrally formed on an outer peripheral edge of the base portion 51 (the base portion 51 of the support ring 49) to project rightward (toward one side in an axial direction of the turbine impeller 29). An annular tip end edge portion (flange portion) 55 is integrally formed on a tip end edge of the intermediate portion 53 of the support ring 49 to project outward in a radial direction of the support ring 49. The tip end edge portion 55 (the flange portion 55 of the support ring 49) is held between the bearing housing 3 and the turbine housing 27.

As shown in FIG. 2, the nozzle ring 57 is integrally provided to the base portion 51 of the support ring 49 by joining end portions (end portions in the axial direction of the turbine impeller 29) respectively of three connection pins 59 to the base portion 51 by riveting, where the end portions thereof are arranged in a circumferential direction of the base portion 51. The nozzle ring 57 is located coaxially with the turbine impeller 29. An outer peripheral edge portion of the heat insulator 43 is fitted to an inner peripheral edge portion of the nozzle ring 57 with biasing force of the corrugated washer 45 bringing the outer peripheral edge portion of the heat insulator 43 into press contact with the inner peripheral edge portion of the nozzle ring 57. Furthermore, multiple support holes 61 (albeit only one support hole 61 is illustrated) penetrating through the nozzle ring 57 are formed in the nozzle ring 57 at equal intervals in a circumferential direction of the nozzle ring 57. Incidentally, although the number of connection pins 59 is three in the embodiment of the present disclosure, the number of connection pins 59 may be four or more.

At a position away from and opposite the nozzle ring 57 in the left-right direction (the axial direction of the turbine impeller 29), a shroud ring 63 is integrally provided to the nozzle ring 57 by joining opposite end portions (opposite end portions in the axial direction of the turbine impeller 29) respectively of the multiple connection pins 59 to the nozzle ring 57 by riveting. The shroud ring 63 is located coaxially with the turbine impeller 29. Multiple support holes 65 are formed in the shroud ring 63 at equal intervals in a circumferential direction of the shroud ring 63. The multiple support holes 65 coincide with the multiple support holes 61 of the nozzle ring 57. The multiple connection pins 59 have a function of setting a clearance between mutually-facing surfaces of the nozzle ring 57 and the shroud ring 63.

The shroud ring 63 includes a cylindrical shroud portion 67 provided to its inner peripheral edge side to cover outer edges of the multiple turbine blades 33. The shroud portion 67 projects toward the gas discharge port 39 (toward a downstream side), and is located inward of the step portion 41 of the turbine housing 27. In addition, a ring groove (circumferential groove) 69 is formed in an outer peripheral surface of the shroud portion 67 of the shroud ring 63. Furthermore, multiple seal rings 71 are provided in an inner peripheral surface of the step portion 41 of the turbine housing 27 in such a manner as to be brought by their own elastic force (elastic force of the multiple seal rings 71) into press contact with each other. The multiple seal rings 71 inhibit the exhaust gas from leaking from the side of the turbine scroll passage 37. Inner peripheral edge portions of the respective seal rings 71 are fitted into the ring groove 69 of the shroud ring 63.

Between the mutually-facing surfaces of the nozzle ring 57 and the shroud ring 63, multiple variable nozzles 73 are placed at equal intervals in the circumferential direction of the nozzle ring 57 (or the shroud ring 63). Each variable nozzle 73 is turnable on its axis, which is in parallel with the axis C of the turbine impeller 29, in forward and reverse directions (opening and closing directions). In addition, a first nozzle shaft 75 is integrally formed on a right side surface (a side surface on the one side in the axial direction of the turbine impeller 29) of each variable nozzle 73. The first nozzle shaft 75 of each variable nozzle 73 is turnably supported by the corresponding support hole 61 of the nozzle ring 57. A second nozzle shaft 77 is integrally formed on a left side surface (a side surface on the opposite side in the axial direction of the turbine impeller 29) of each variable nozzle 73 in such a manner as to be coaxial with the first nozzle shaft 75. The second nozzle shaft 77 of each variable nozzle 73 is turnably supported by the corresponding support hole 65 of the shroud ring 63. Incidentally, clearances (distances) between adjacent variable nozzles 73 do not have to be constant with the shape and aerodynamic influence of each variable nozzle 73 taken into consideration. In the case where the clearances between adjacent variable nozzles 73 are not constant, clearances between adjacent support holes 61 and clearances between adjacent support holes 65 are set coinciding with the clearances between the variable nozzles 73 adjacent to each other.

As shown in FIG. 2, a link mechanism (synchronization mechanism) 81 configured to synchronously turn the multiple variable nozzles 73 in the forward and reverse directions (the opening and closing directions) is placed inside an annular link chamber 79 formed on the opposite side of the nozzle ring 57 from the facing surface. The link mechanism 81 is linked and connected to the first nozzle shafts 75 of the multiple variable nozzles 73. The link mechanism 81 has a publicly-known configuration which is shown in PTLs 1 and 2 given above and the like. The link mechanism 81 is connected, via a power transmission mechanism 83, to a turn actuator (whose illustration is omitted), such as a motor or a cylinder, configured to turn the multiple variable nozzles 73 in the opening and closing directions.

Descriptions will be subsequently provided for a main part of the configuration of the variable nozzle unit 47 of the embodiment of the present disclosure.

As shown in FIGS. 1A and 1B, the support ring 49 includes the annular base portion 51, the cylindrical intermediate portion 53 and the annular tip end edge portion (flange portion) 55, as described above. Furthermore, the base portion 51 of the support ring 49 includes three bridge-shaped joining areas A1 (as many as the connection pins 59) provided in the circumferential direction. Each joining area A1 surrounds a pin hole 85 through which to insert one end portion of the corresponding connection pin 59. Each joining area A1 is in contact with an opposite surface of the nozzle ring 57 from its facing surface.

First cuts 87 are formed in parts of the support ring 49 which are located outward of the respective joining areas A1 in the radial direction of the support ring 49. Each first cut 87 is formed extending from the base portion 51 to the intermediate portion 53. The first cut 87 extends in a direction of a tangent to the circumference of the nozzle ring 57. A second cut 89 or second cuts 91 are formed outward of the respective joining areas A1 in the radial direction of the support ring 49, and between the adjacent first cuts 87, 87 in a circumferential direction of the support ring 49. The second cut 89 and the second cuts 91 extend from the base portion 51 to the intermediate portion 53. The first cuts 87 and the second cuts 89, 91 are configured to be capable of allowing deformation (displacement) of the intermediate portion 53 of the support ring 49 relative to the joining areas A1.

It should be noted that the widths (widths in directions orthogonal to the extension directions) of the first cuts 87 and the second cuts 89, 91 are arbitrary as long as the widths do not hinder the intended function and mechanical strength of the support ring 49 as well as the above-described function of the cuts. In other words, each width may be constant at any place in its extension direction. Otherwise, each width may change in accordance with the shape of its adjacent members, for example. Furthermore, values of the widths may differ from each other. For example, in the case shown in FIG. 1A, the width of the cut 89 is set greater than the widths of the first and second cuts 87, 91, reflecting positional relationships among the joining areas A1.

Descriptions will be subsequently provided for the operation and effect of the embodiment of the present disclosure.

The exhaust gas introduced from the gas introduction port 35 passes through the turbine scroll passage 37, and flows from the inlet to outlet of the turbine impeller 29. Thereby, the turbine impeller 29 produces the rotational force (rotational torque) using the pressure energy of the exhaust gas. Thus, the rotor shaft 9 and the compressor impeller 13 can be rotated integrally with the turbine impeller 29. By this, the air introduced from the air introduction port 19 is compressed. The compressed air passes through the diffuser passage 21 and the compressor scroll passage 23, and is discharged from the air discharge port 25. Thereby, the air to be supplied to the engine is boosted (compressed).

While the variable geometry system turbocharger 1 is in operation, if the engine speed is in a high speed range and the flow rate of the exhaust gas is high, the turn actuator operates the link mechanism 81, and the link mechanism 81 thus synchronously turns the multiple variable nozzles 73 in the forward direction (the opening direction). Thereby, the area of the gas passage of (the throat area of the variable nozzles 73 for) the exhaust gas to be supplied to the turbine impeller 29 is increased, and accordingly more of the exhaust gas is supplied to the turbine impeller 29. Meanwhile, if the engine speed is in a low speed range and the flow rate of the exhaust gas is low, the turn actuator operates the link mechanism 81, and the link mechanism 81 thus synchronously turns the multiple variable nozzles 73 in the reverse direction (the closing direction). Thereby, the area of the gas passage of the exhaust gas to be supplied to the turbine impeller 29 is decreased, and the flow velocity of the exhaust gas is accordingly increased. Thereby, workload to be performed by the turbine impeller 29 is secured sufficiently. For this reason, regardless of whether the flow rate of the exhaust gas is high or low, the turbine impeller 29 is capable of producing the rotational force of the engine sufficiently and stably.

As described above, the base portion 51 of the support ring 49 includes the multiple joining areas A1 arranged in the circumferential direction of the support ring 49 to surround the respective pin holes 85. As described above, the support ring 49 includes the first cuts 87, the second cut 89 and the second cuts 91 formed around the joining areas A1. For this reason, even if while the variable geometry system turbocharger 1 is in operation, the intermediate portion 53 of the support ring 49 is thermally deformed to expand from inside, the nozzle ring 57 can be inhibited from being deformed in response to the thermal deformation of the intermediate portion 53. Thereby, while the variable geometry system turbocharger 1 is in operation, the parallelism between the mutually-facing surfaces of the nozzle ring 57 and the shroud ring 63 can be sufficiently secured without setting a larger nozzle-side clearance. In other words, the nozzle-side clearance can be reduced as much as possible while sufficiently securing the parallelism between the mutually-facing surfaces of the nozzle ring 57 and the shroud ring 63 while the variable geometry system turbocharger 1 is in operation.

Meanwhile, the area of the opening of each of the first cuts 87 and the second cuts 91 is small. For this reason, the support ring 49 can keep its function as the heat insulator for the link mechanism 81.

Accordingly, the embodiment of the present disclosure can sufficiently secure the stability of the turn operation of the multiple variable nozzles 73 by inhibiting unsmooth turn of the multiple variable nozzles 73, and can concurrently enhance the turbine efficiency of the variable geometry system turbocharger 1 by reducing the leaking flow of the exhaust gas through the nozzle-side clearance.

Furthermore, as described above, the embodiment of the present disclosure enables the support ring 49 to keep its function as the heat insulator for the link mechanism 81 by reducing the area of the opening of each of the first cuts 87 and the second cuts 91. For this reason, the embodiment of the present disclosure can sufficiently secure the durability of the variable nozzle unit 47, or the durability of the variable geometry system turbocharger 1, by inhibiting the thermal deformation of the link mechanism 81.

(Modification 1)

Figure 4A:
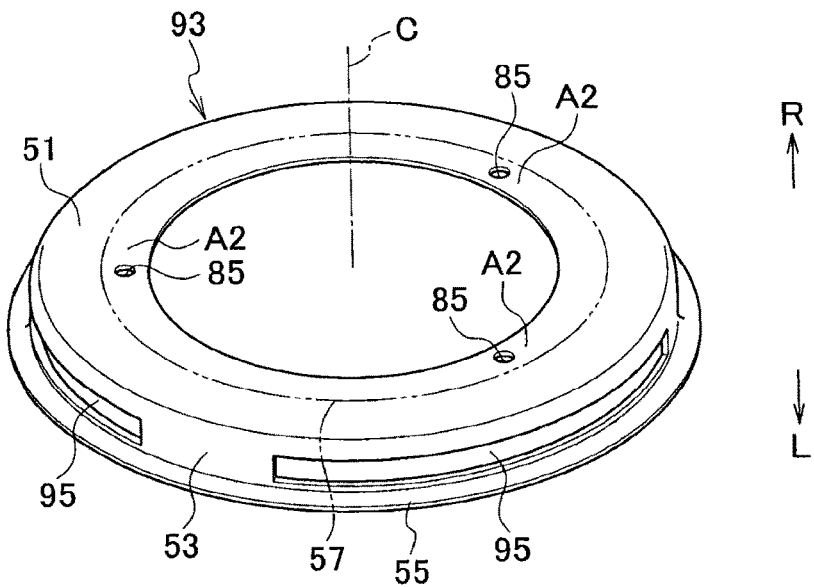
FIG. 4A is a perspective view of a support ring of modification 1 of the embodiment of the present disclosure.

As modification 1 of the embodiment of the present disclosure, the support ring 49, which is a constituent component of the variable nozzle unit 47, may be replaced with a support ring 93 as shown in FIG. 4A.

Like the support ring 49, the support ring 93 includes an annular base portion 51, a cylindrical intermediate portion 53, and an annular tip end edge portion (flange portion) 55. The base portion 51 of the support ring 93 includes three joining areas A2 arranged in a circumferential direction of the support ring 93 (the base portion 51). The three joining areas A2 surround the respective pin holes 85, and are in contact with the opposite surface of the nozzle ring 57 from its facing surface. Cuts 95 are formed in the intermediate portion 53 of the support ring 93 in the circumferential direction of the support ring 93 (the intermediate portion 53). The cuts 95 are located outward of the respective joining areas A2 in a radial direction of the support ring 93.

Furthermore, the cuts 95 are configured to be capable of allowing deformation of the intermediate portion 53 of the support ring 93 relative to the joining areas A2.

It should be noted that the use of the support ring 93 as the one constituent component of the variable nozzle unit 47 brings about the same operation and effect as does the embodiment of the present disclosure.

(Modification 2)

Figure 4B:
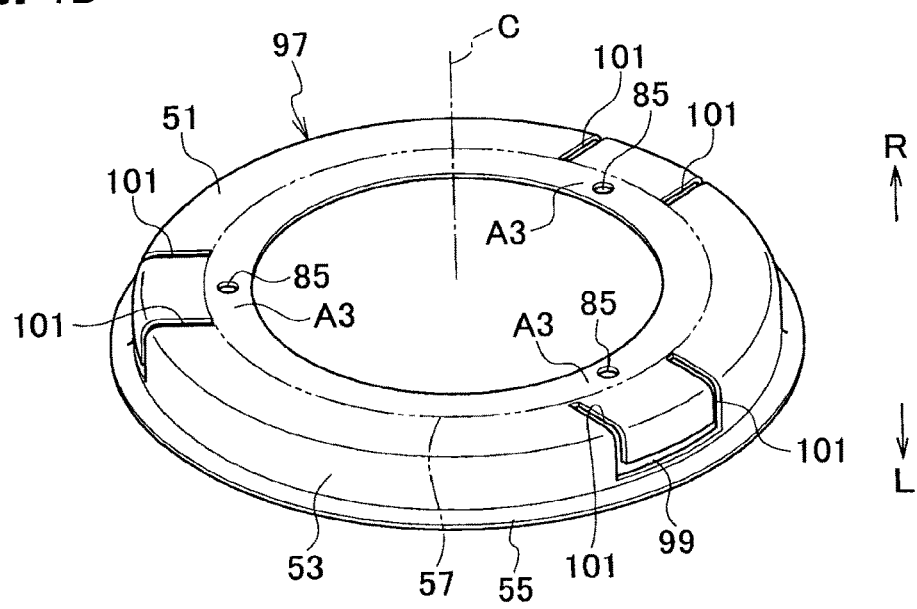
FIG. 4B is a perspective view of a support ring of modification 2 of the embodiment of the present disclosure.

As modification 2 of the embodiment of the present disclosure, the support ring 49, which is a constituent component of the variable nozzle unit 47, may be replaced with a support ring 97 as shown in FIG. 4B.

Like the support ring 49, the support ring 97 includes an annular base portion 51, a cylindrical intermediate portion 53, and an annular tip end edge portion (flange portion) 55. The base portion 51 of the support ring 97 includes three joining areas A3 arranged in a circumferential direction of the support ring 97 (the base portion 51). The three joining areas A3 surround the respective pin holes 85, and are in contact with the opposite surface of the nozzle ring 57 from its facing surface. First cuts 99 are formed in the intermediate portion 53 of the support ring 97 in the circumferential direction of the support ring 97 (the intermediate portion 53). Two second cuts 101, 101 are formed outward of each joining area A3 in a radial direction of the support ring 97 in such a manner as to extend respectively from the two end portions of the corresponding first cut 99 to the base portion 51. In addition, the first cuts 99 and the second cuts 101 are configured to be capable of allowing deformation of the intermediate portion 53 of the support ring 97 relative to the joining areas A3. The widths of the first cuts 99 and the second cuts 101 are arbitrary as long as the widths satisfy the conditions expected for the first cuts 87 and the second cuts 89, 91 as in the case of the first cuts 87 and the second cuts 89, 91.

It should be noted that the use of the support ring 97 as the one constituent component of the variable nozzle unit 47 brings about the same operation and effect as does the embodiment of the present disclosure.

(Modification 3)

Figure 5:
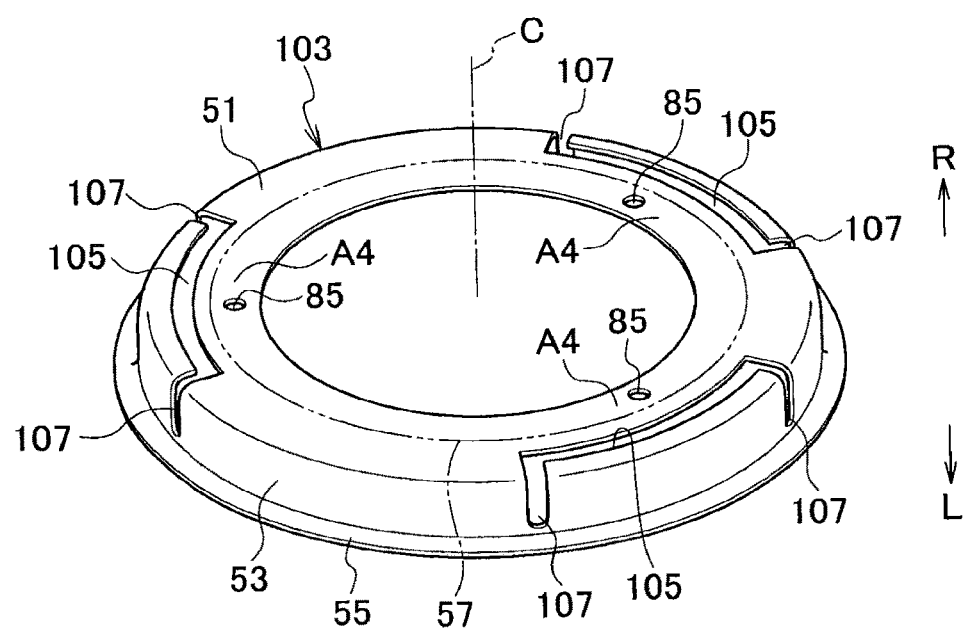
FIG. 5 is a perspective view of a support ring of modification 3 of the embodiment of the present disclosure.

As modification 3 of the embodiment of the present disclosure, the support ring 49, which is a constituent component of the variable nozzle unit 47, may be replaced with a support ring 103 as shown in FIG. 5.

Like the support ring 49, the support ring 103 includes an annular base portion 51, a cylindrical intermediate portion 53, and an annular tip end edge portion (flange portion) 55. The base portion 51 of the support ring 103 includes three joining areas A4 arranged in a circumferential direction of the support ring 103 (the base portion 51). The three joining areas A4 surround the respective pin holes 85, and are in contact with the opposite surface of the nozzle ring 57 from its facing surface. The base portion 51 includes first cuts 105 formed in its parts located outward of the respective joining areas A4 in a radial direction of the support ring 103. Each first cut 105 is formed extending in the circumferential direction of the support ring 103 (the base portion 51). Two second cuts 107 are formed in a part of the support ring 103 located outward of each joining area A4 in the radial direction of the support ring 103 in such a manner as to extend respectively from the two end portions of the corresponding first cut 105 to the intermediate portion 53. In addition, the first cuts 105 and the second cuts 107 are configured to be capable of allowing deformation of the intermediate portion 53 of the support ring 103 relative to the joining areas A4. The widths of the first cuts 105 and the second cuts 107 are arbitrary as long as the widths satisfy the conditions expected for the first cuts 87 and the second cuts 89, 91 as in the case of the first cuts 87 and the second cuts 89, 91.

It should be noted that the use of the different support ring 103 as the one constituent component of the variable nozzle unit 47 brings about the same operation and effect as does the embodiment of the present disclosure.

The present disclosure is not limited to what has been described for the embodiment of the present disclosure, and can be carried out in various modes. Furthermore, the scope of right included in the present disclosure is not limited to the embodiment.

What is claimed is:

1. A variable nozzle unit configured to be placed surrounding a turbine impeller inside a turbine housing of a variable geometry system turbocharger, and capable of varying an area of a passage of an exhaust gas to be supplied to the turbine impeller, comprising:
    a support ring configured to be placed inside the turbine housing, and including
        an annular base portion,
        a cylindrical intermediate portion integrally formed on an outer peripheral edge of the base portion to project toward one side in an axial direction of the turbine impeller, and
        an annular tip end edge portion integrally formed on a tip end edge of the intermediate portion to project outward in a radial direction of the support ring, and held between the turbine housing and a bearing housing of the variable geometry system turbocharger;
    a nozzle ring integrally provided to the base portion of the support ring by joining end portions of three or more connection pins to the base portion thereof, the connection pins arranged in a circumferential direction of the base portion;
    a shroud ring integrally provided to the nozzle ring by joining opposite end portions of the connection pins to the shroud ring at a position away from the nozzle ring in the axial direction, and covering tip end edges respectively of a plurality of turbine blades of the turbine impeller; and
    a plurality of variable nozzles placed between mutually-facing surfaces of the nozzle ring and the shroud ring in a circumferential direction of the nozzle ring or the shroud ring, and capable of turning on axes thereof in forward and reverse directions, the axes being in parallel with an axis of the turbine impeller, wherein
    the base portion of the support ring includes as many joining areas as the connection pins, the joining areas respectively surround pin holes through which to insert the end portions of the connection pins, the joining areas are in contact with an opposite surface of the nozzle ring from the facing surface of the nozzle ring, and the joining areas are arranged in a circumferential direction of the support ring, and
    a cut is formed in each of parts of the support ring which are located behind and outward of the respective joining areas in the radial direction of the support ring, with respect to the axis of the turbine impeller.

2. The variable nozzle unit according to claim 1, wherein the cut has to be defined by its extension from the base portion to the cylindrical intermediate portion.

3. The variable nozzle unit according to claim 2, wherein the cut comprises:
    a first cut formed in a part of the support ring located outward of each joining area in the radial direction of the support ring to extend from the base portion to the intermediate portion, and extending in a direction of a tangent to the nozzle ring; and a second cut formed outward of each joining area in the radial direction of the support ring, and between the first cuts adjacent in the circumferential direction of the support ring, and extending from the base portion to the intermediate portion.

4. The variable nozzle unit according to claim 2, wherein the cut includes a first cut formed in a part of the intermediate portion of the support ring, or in a part of the base portion of the support ring located outward of each joining area in the radial direction of the support ring, and extending in the circumferential direction of the support ring, and two second cuts formed outward of each joining area in the radial direction of the support ring, and extending respectively from two ends portions of the first cut to the base portion or the intermediate portion.

5. The variable nozzle unit according to claim 1, wherein the cut is configured to be capable of allowing deformation of the intermediate portion of the support ring relative to the joining areas.

6. The variable nozzle unit according to claim 5, wherein the cut comprises:

a first cut formed in a part of the support ring located outward of each joining area in the radial direction of the support ring to extend from the base portion to the intermediate portion, and extending in a direction of a tangent to the nozzle ring; and a second cut formed outward of each joining area in the radial direction of the support ring, and between the first cuts adjacent in the circumferential direction of the support ring, and extending from the base portion to the intermediate portion.

7. The variable nozzle unit according to claim 5, wherein the cut is formed in the intermediate portion of the support ring in the circumferential direction of the support ring.

8. The variable nozzle unit according to claim 5, wherein the cut includes a first cut formed in a part of the intermediate portion of the support ring, or in a part of the base portion of the support ring located outward of each joining area in the radial direction of the support ring, and extending in the circumferential direction of the support ring, and two second cuts formed outward of each joining area in the radial direction of the support ring, and extending respectively from two ends portions of the first cut to the base portion or the intermediate portion.

9. The variable nozzle unit according to claim 1, wherein the cut comprises:

a first cut formed in a part of the support ring located outward of each joining area in the radial direction of the support ring to extend from the base portion to the intermediate portion, and extending in a direction of a tangent to the nozzle ring; and a second cut formed outward of each joining area in the radial direction of the support ring, and between the first cuts adjacent in the circumferential direction of the support ring, and extending from the base portion to the intermediate portion.

10. The variable nozzle unit according to claim 1, wherein the cut is formed in the intermediate portion of the support ring in the circumferential direction of the support ring.

11. The variable nozzle unit according to claim 1, wherein the cut includes a first cut formed in a part of the intermediate portion of the support ring, or in a part of the base portion of the support ring located outward of each joining area in the radial direction of the support ring, and extending in the circumferential direction of the support ring, and two second cuts formed outward of each joining area in the radial direction of the support ring, and extending respectively from two ends portions of the first cut to the base portion or the intermediate portion.

12. A variable geometry system turbocharger configured to boost air to be supplied to an engine by use of energy of an exhaust gas from the engine, comprising the variable nozzle unit according to claim 1.

* * * * *